(12) United States Patent
Coluni

(10) Patent No.: US 11,173,999 B2
(45) Date of Patent: Nov. 16, 2021

(54) AIRCRAFT FLOOR STRUCTURE

(71) Applicant: C SERIES AIRCRAFT LIMITED PARTNERSHIP, Mirabel (CA)

(72) Inventor: Angelo Coluni, Mount-Royal (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 0 days.

(21) Appl. No.: 16/683,703

(22) Filed: Nov. 14, 2019

(65) Prior Publication Data

US 2020/0156757 A1 May 21, 2020

Related U.S. Application Data

(60) Provisional application No. 62/767,572, filed on Nov. 15, 2018.

(51) Int. Cl.
*B64C 1/18* (2006.01)
*B32B 3/02* (2006.01)
*B32B 3/30* (2006.01)
*B32B 7/12* (2006.01)
*B64C 1/00* (2006.01)

(52) U.S. Cl.
CPC .................. *B64C 1/18* (2013.01); *B32B 3/02* (2013.01); *B32B 3/30* (2013.01); *B32B 7/12* (2013.01); *B64C 1/00* (2013.01); *B32B 2307/7242* (2013.01); *B32B 2605/18* (2013.01); *B64C 2001/009* (2013.01)

(58) Field of Classification Search
CPC ....... B64C 1/18; B64C 1/00; B64C 2001/009; B32B 3/02; B32B 3/30; B32B 7/12; B32B 2307/7242; B32B 2605/18
See application file for complete search history.

(56) References Cited

U.S. PATENT DOCUMENTS

| | | | |
|---|---|---|---|
| 2002/0146540 A1* | 10/2002 | Johnston | A61F 13/53708 428/167 |
| 2005/0147786 A1* | 7/2005 | Clark | B32B 27/32 428/95 |
| 2008/0233337 A1* | 9/2008 | Wilson | B32B 3/04 428/95 |
| 2016/0083072 A1 | 3/2016 | Koreis | |

* cited by examiner

*Primary Examiner* — Brian Handville
(74) *Attorney, Agent, or Firm* — Norton Rose Fulbright Canada LLP

(57) ABSTRACT

An aircraft cabin floor structure which makes it possible to avoid the appearance of blisters in the carpets covering the floor panels in an aircraft cabin is disclosed. The aircraft cabin floor structure comprises a rigid carpet that is impermeable to air having a top face and a bottom face, an adhesive layer having an adhesive top face and an adhesive bottom face, said top face adhering to the bottom face of the carpet, and a floor panel that is impermeable to air having a top face and a bottom face, the bottom face of the adhesive layer adhering to the top face of the floor panel. The bottom face of the carpet comprises grooves and at least one air evacuation channel over its periphery. The adhesive layer comprises a plurality of through holes.

14 Claims, 3 Drawing Sheets

AIRCRAFT FLOOR STRUCTURE

CROSS REFERENCE TO RELATED APPLICATION AND CLAIM OF PRIORITY

This application relies for priority on U.S. Provisional Patent Application Ser. No. 62/767,572 filed on Nov. 15, 2018, the entire content of which is incorporated herein by reference.

TECHNICAL FIELD

The present invention relates to an aircraft floor structure and in particular an aircraft cabin floor comprising a carpet covering floor panels.

BACKGROUND

FIGS. 1a and 1b describe the composition of an aircraft floor according to the state of the art. More particularly, FIG. 1a describes an aircraft cabin floor comprising an air-impermeable carpet 2 and a floor panel 4. The carpet 2 is fixed onto the floor panel 4 by means of an adhesive 3. This adhesive, generally a double-sided adhesive, is positioned at the periphery of the floor panel 4. When the carpet 2 is fixed to the floor panel 4, air at ambient pressure is held captive in the zone 5. During the flight, for passenger comfort reasons, the pressure of the aircraft cabin is adapted to reach a pressure corresponding to an altitude of approximately 2000 metres. As the cabin pressure reduces, the pressure of the air held captive in the zone 5 then becomes greater than the pressure prevailing in the cabin. This pressure difference provokes an expansion of the captured air and leads to the appearance of blisters in the carpet 2.

To resolve this problem one possibility consists in piercing these blisters once they have appeared. This solution is unsatisfactory because it implies an action after the fact while the airline is operating the airplane and it has to fulfil its missions within the times allotted. Such an operation can take time. Furthermore, it is unsatisfactory from an aesthetic point of view.

Gluing the carpet 2 onto all of the surface of the floor panel 4 has also been considered. The latter solution does not guarantee the absence of air between the air-impermeable carpet 2 and the floor panel 4. The appearance of blisters can therefore still occur. Furthermore, in the carpet 2 replacement phase, the latter is made more difficult because of the presence of the adhesive over all the surface of the carpet and of the floor panel 4. The tearing away of the carpet 2 can damage the floor panel 4 because of the adhesive power of the adhesive used.

FIG. 1b describes another aircraft floor configuration disclosed in the document US2016/0083072. This floor comprises an air-impermeable carpet 6, a first layer 7 made of composite material in which holes 7a have been made, a honeycomb panel 8 and a second layer 9 made of composite material including holes 9a. As in the preceding example, air at ambient pressure is held captive between the carpet 6 and the first layer 7. By virtue of the configuration described in this document, this air is evacuated through the holes 7a of the first layer 7, the opening cells of the honeycomb panel 8 and the holes 9a of the second layer 9 to a cargo zone for example. The issue of blistering is therefore hindered or avoided. However, the number of components of this floor has been increased, which is detrimental from the overall weight point of view. Now, the design of an airplane inevitably includes an optimization of the mass. Furthermore, manufacturing such a floor is more complicated than manufacturing the floor as described in FIG. 1a. In addition, such a floor does not make it possible to protect the elements of the structure of the floor or those arranged under the floor from any accidental introduction of liquid. Indeed, the open cells of the honeycomb panel 8 together with the holes 9a of the second layer 9 made of composite material make it possible for moisture to be introduced into these zones of the airplane where, for safety and/or corrosion reasons, it would be preferable not to have any. Finally, such a floor may not comply with the regulations concerning thermal insulation (FAR25.856), the presence of the holes possibly not being able to limit the propagation of flames.

SUMMARY

The present disclosure describes an aircraft cabin floor structure comprising:

a. a rigid carpet impermeable to air having a top face and a bottom face, b. an adhesive layer having an adhesive top face and an adhesive bottom face, said top face adhering to the bottom face of the carpet, and c. a floor panel impermeable to air having a top face and a bottom face, the bottom face of the adhesive layer adhering to said top face, said floor being noteworthy in that the bottom face of the carpet includes grooves and comprises, on its periphery, at least one air evacuation channel, and in that the adhesive layer comprises a plurality of through holes.

In the context of the present disclosure, the expression "top face" should be understood to be the face which is located on the side of the passenger cabin of the aircraft and which is oriented upwards in the normal use of an aircraft, whereas the expression "bottom face" means the face opposite the top face and therefore the one which is oriented downwards.

Thus, the air held captive between the carpet and the floor panel in the manufacturing of the floor is evacuated by virtue of the perforations of the adhesive layer and is drained by the hollows formed by the grooves of the carpet to the evacuation channel. Thus, in flight, the pressure between the air of the cabin and the air held captive in the structure of the floor is balanced, hindering or avoiding the appearance of blisters or of crinkling.

The presence of at least one air evacuation channel may enhance the internal ventilation of the floor, thus making it possible to more effectively dry the moisture which could, despite everything, be present in the constituent layers of the floor.

According to particular embodiments:

At least one evacuation channel may be linked to at least one evacuation pipe. This feature may facilitate the evacuation of the air into a suitable zone, the passenger cabin for example.

The grooves may be incorporated directly in the carpet during the manufacturing thereof. Thus, the carpet may take the form of a single monolithic piece where the manufacturing thereof is therefore simple. To manufacture this carpet, it will be possible to use techniques known to the person skilled in the art such as, for example, the techniques of thermoforming or of die cutting.

The grooves may be added after the carpet has been manufactured. In this case, they may be secured to the carpet by any suitable fixing means, such as an adhesive for example.

The grooves may be toothed.

The evacuation channel may be arranged over an entirety of the periphery of the air-impermeable carpet. Thus, the evacuation of the air may be optimized.

The grooves may be distributed over an entirety of the width of the air-impermeable carpet. Their length may be equal to the length of the air-impermeable carpet. These features may allow for a good draining of the air.

The height of the grooves may lie between 20% and 30% of the height of the air-impermeable carpet, preferentially about 25% and the width of the grooves may lie between 20% and 30% of the total height of the air-impermeable carpet, preferentially about 25%. By virtue of these geometrical features, the stiffness of the carpet may be retained because the carpet, despite the presence of these grooves, has to be capable of protecting the floor panels from abuses linked to movements or to any other abuse linked to the occupancy of the cabin of the airplane.

The width of the evacuation channel may lie between 20% and 30%, preferentially about 25%, of the total height of the air-impermeable carpet. As for the preceding feature, the geometrical dimensions of the evacuation channel should not prevent the carpet from protecting the floor panels.

The width of the evacuation channel may be equal to the width of the grooves. The carpet manufacturing may then be simplified.

The grooves may have the form of a sinusoidal wave. This form may allow for the evacuation of the air.

DETAILED DESCRIPTION

Figure 1A:
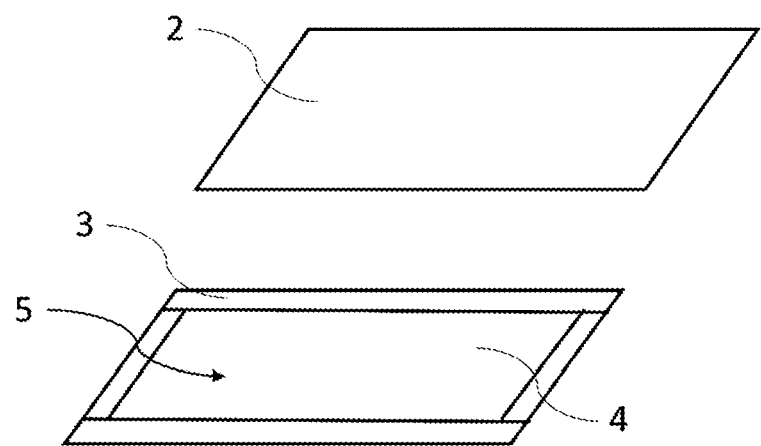
FIGS. 1a and 1b represent an aircraft cabin floor structure according to the prior art.
Figure 1B:
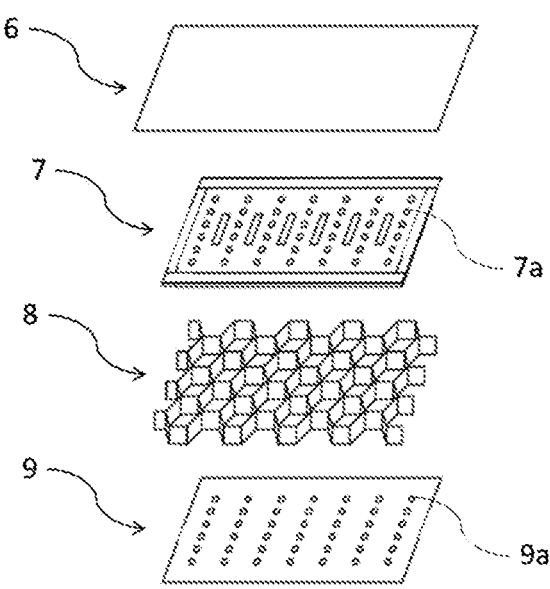

FIGS. 1a and 1b have already been previously described.

Figure 2:
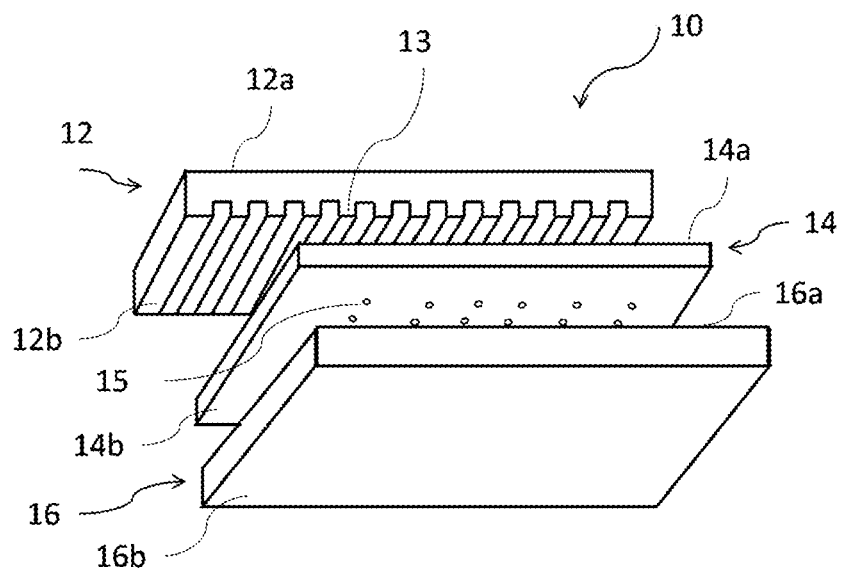
FIG. 2 represents an aircraft cabin floor structure according to an embodiment of the disclosure.
Figure 3:
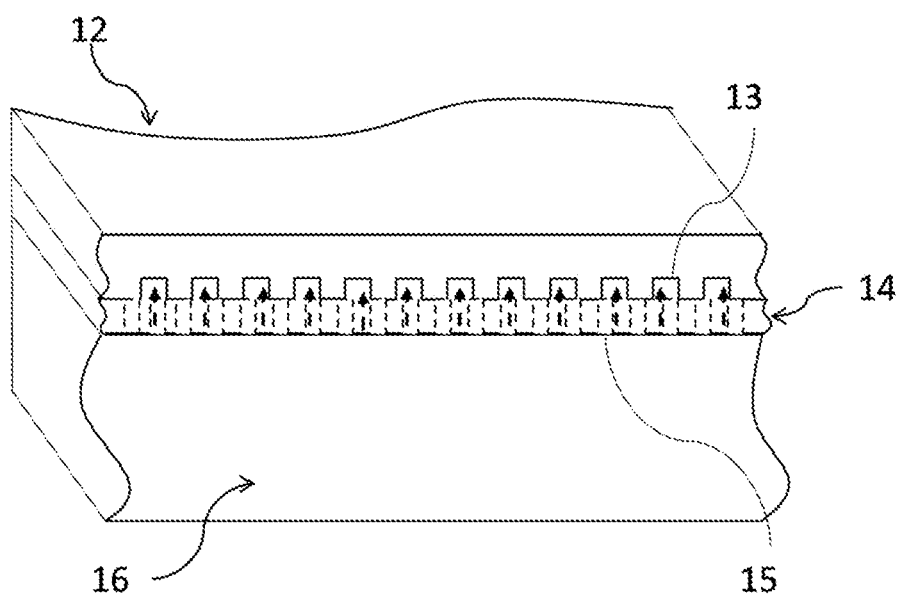
FIG. 3 represents a cross-sectional view of a floor structure according to an embodiment of the disclosure.

Referring to FIGS. 2 and 3, an aircraft floor structure 10 is described that comprises a rigid carpet 12 that is impermeable to air, an adhesive layer 14 and a floor panel 16.

The air-impermeable rigid carpet 12 comprises a top face 12a and a bottom face 12b. This carpet 12 serves to protect the floor panels onto which it is glued from the abuses linked to the movements of the passengers or of the galleys or any other abuse associated with the occupancy of the cabin of the airplane. The top face 12a of the carpet 12 has surface that is substantially flat so as to facilitate the movement of the passengers or of the galleys. This carpet 12 can have a rectangular or square form whose dimensions are adapted to cover a floor panel 16 of an aircraft. The edges of this carpet 12 are, likewise, adapted to cooperate with the edges of the adjacent carpets such that, when placed end to end, the carpets 12 form the totality of the structure of the floor of the aircraft cabin.

It is recalled here that, in the context of the present disclosure, the expression "top face" should be understood to be the face which is located on the side of the passenger cabin of the aircraft and which is oriented upwards in an normal use of an aircraft whereas the expression "bottom face" means the face opposite the top face and therefore which is oriented downwards.

Such a carpet 12 can, for example, be manufactured from BATIFLEX® AV135 or BATIFLEX® AVM282G. These materials are compliant with the regulations concerning thermal insulation. They are also materials which have a perfect dimensional stability and anti-slip properties. Equivalent materials can be used to manufacture this air-impermeable carpet 12. These carpets are arranged on the floor panels during the installation of the commercial trim.

Figure 4:
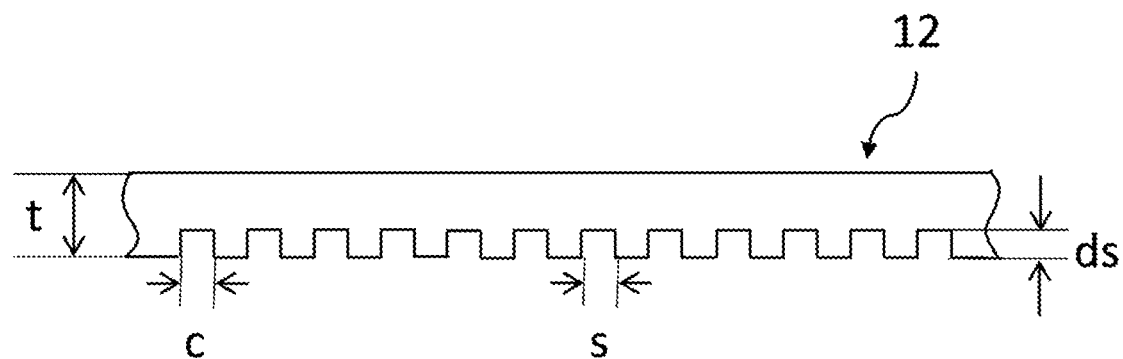
FIG. 4 is a cross-sectional view of an air-impermeable carpet.

The bottom face 12b of the carpet 12 comprises grooves 13 which come into contact with the adhesive layer 14. FIG. 4 more specifically describes the characteristics of the carpet 12 and of the grooves 13. The total height (t) (i.e., thickness) of the carpet 12 is approximately 0.150 inches. The height (ds) (i.e., depth) of the grooves 13 can represent between 20% and 30% of the total height (t) of the carpet 12, preferentially 25%. The width(s) of a groove 13 can lie between 20% and 30%, preferentially 25%, of the total height (t) of the carpet 12. These geometrical characteristics make it possible to converse the stiffness of the carpet 12 because the carpet 12, despite the presence of the grooves 13, has to be capable of protecting the floor panels 16 from the abuses associated with movements or with any other abuse linked to the occupancy of the cabin of the airplane.

It is recalled that these numeric data are given by way of illustrative example and that they should not therefore be understood to be a limitation on the invention.

These grooves 13 are distributed over an entirety of the width of the air-impermeable carpet 12 and their length is equal to the length of the carpet 12. These features allow for a good draining of the air.

In this exemplary embodiment, the grooves 13 are incorporated directly in the carpet 12, during the manufacturing thereof. Thus, the carpet 12 takes the form of a single monolithic piece, so the manufacturing thereof is therefore simple. To manufacture this carpet 12, it will be possible to use techniques known to the person skilled in the art such as, for example, techniques of thermoforming or of die cutting.

In a variant embodiment, the grooves 13 are produced in a manufacturing process separate from the air-impermeable rigid carpet 12 manufacturing process. They are therefore added afterwards, once the carpet 12 has been manufactured. In this variant, the grooves 13 are secured to the carpet 12 by any suitable fixing means known from the state of the art, such as an adhesive for example.

Figure 5:
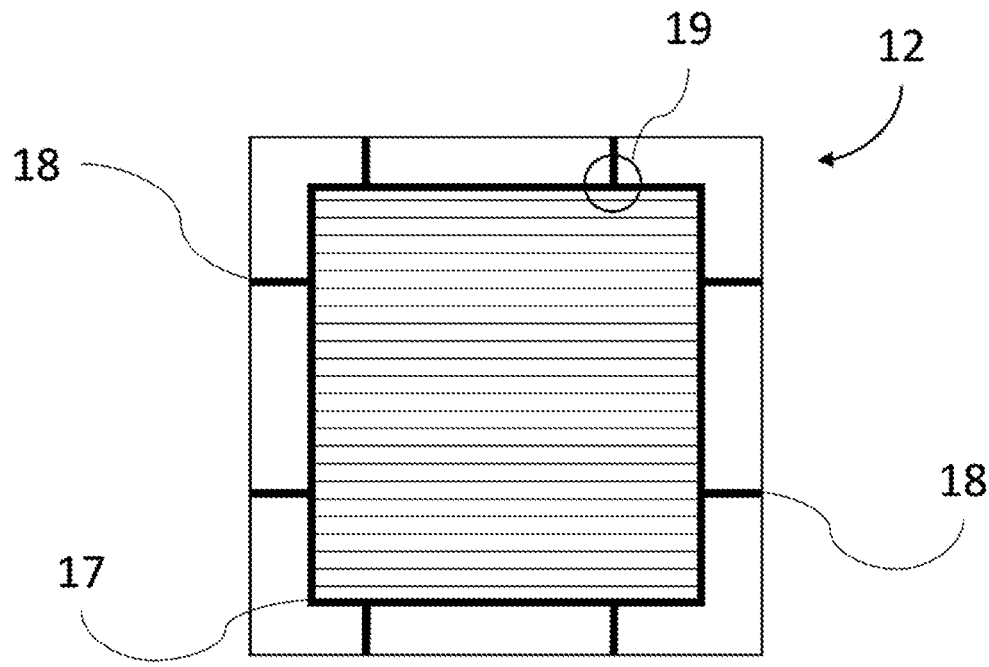
FIG. 5 is a plan view of the air-impermeable carpet.

As illustrated in FIG. 5, said carpet has, on its periphery, at least one evacuation channel 17 linked to at least one evacuation pipe 18. When the air-impermeable carpet 12, the adhesive layer 14 and the floor panel 16 are stacked, air is held captive between the carpet 12 and the floor panel 16. The grooves 13 form channels by virtue of which the air is first of all channeled and drained towards the evacuation channel 17 then evacuated, by virtue of the evacuation pipes 18, to a suitable zone, such as the cabin zone for example.

The width (c) of the evacuation channel 17 can lie between 20% and 30%, preferentially 25%, of the total height of the carpet 12. It can also be equal to the width(s) of the grooves 13.

In a variant embodiment, the evacuation channel 17 is arranged over an entirety of the periphery of the air-impermeable carpet 12. In other words, the evacuation channel 17 can form a complete loop extending around a periphery of the carpet 12. This makes it possible to improve the evacuation of the air and even to create a ventilation which dries the moisture which could, despite everything, be introduced into the floor structure.

The form of the grooves 13 can be different without departing from the scope of the invention. To this end, they can be toothed as in the schematic representation of the figures or take the form of a sinusoidal wave.

The floor 10 comprises, in addition, an adhesive layer 14 having an adhesive top face 14a and an adhesive bottom face 14b. The top face 14a adheres to the bottom face 12b of the air-impermeable carpet 12. This adhesive layer 14 can have a rectangular or square form whose dimensions are adapted to cover a floor panel 16 of an airplane. The edges of this adhesive layer 14 are, likewise, adapted to cooperate with the edges of the adjacent carpets 12 such that, when placed end to end, the carpets 12 cover all of the floor of the aircraft. This adhesive layer 14 can, for example, have the form of a conventional double-sided adhesive tape. It can also be a differential adhesive tape (Relink 2318B® brand for example) whose top face 14a has a very high adherence for adhering to the carpet 12 and whose bottom face 14b exhibits a lesser adherence so as to adhere to the floor panel 16 while being removable, which allows an easier air-impermeable carpet replacement.

The adhesive layer 14 comprises, in addition, a plurality of through-holes 15 distributed over all the surface area thereof. In order to conserve the qualities of adhesion of this adhesive layer, the number of holes 15 should not be greater than 5 holes/inch$^2$, preferentially 1 hole/inch$^2$.

The structure of the floor 10 comprises an air-impermeable floor panel 16 having a top face 16a and a bottom face 16b, said top face 16a adhering to the bottom face 14b of the adhesive layer 14. These two faces 16a, 16b have a surface that is substantially flat in order for them to be able to be fixed, by means of bolts or any type of suitable fixing means, onto seat mounting rails. This panel 16 can have a rectangular or square form whose dimensions are adapted to cover the floor 10 of an aircraft. The edges of this panel 16 are, likewise, adapted to cooperate with the edges of the adjacent carpets 12 such that, when placed end to end, the carpets 12 cover all of the floor of the cabin of the aircraft.

This floor panel 16 is generally made of composite material but equivalent materials can be used to manufacture the floor panel 16. The presence of this panel which does not include open cells thus prevents any moisture from being insinuated into zones of the aircraft.

Thus, in the manufacture of the floor 10, air is held captive between the carpet 12 and the adhesive layer 14 and between the adhesive layer 14 and the floor panel 16. This air is at ambient pressure of the place of manufacture of the floor. During the flight of the aircraft, the pressure of the cabin decreases relative to the pressure on the ground while the air held captive remains at the ambient pressure of the place of manufacture of the floor. Because of the pressure difference between the air of the cabin and the air held captive, the latter expands. The air held captive between the adhesive layer 14 and the floor panel 16 passes through the multiple holes 15 of the adhesive layer 14 and is channeled and drained by the grooves 13 towards the evacuation channel 17. This air is then evacuated by the virtue of the evacuation pipes 18. Thus, the pressure is balanced between the cabin of the aircraft and the structure of the floor 10 which avoids the appearance of blisters or of crinkling of the floor of the cabin of the aircraft.

A method that makes it possible to avoid the appearance of blisters on an aircraft floor structure 10 will now be described.

During the manufacturing of an aircraft floor structure, air at ambient pressure is held captive between the different constituent layers of this panel. During the flight of the aircraft, the pressure of the air present in the cabin corresponds to a pressure of approximately 2000 meters of altitude. There is therefore a pressure difference between the air present in the cabin and the air held captive in the structure of the floor. This pressure difference generates the appearance of blisters. The use of the air-impermeable rigid carpet, of the adhesive layer and of the floor panel according to an embodiment of the disclosure makes it possible to avoid the appearance of these blisters and of crinkling.

In this exemplary implementation, the method making it possible to avoid the appearance of blisters on an aircraft floor 10 comprises a step of placement of an air-impermeable floor panel 16. This panel has a top face 16a and a bottom face 16b. The bottom face 16b is fixed in a conventional way onto the floor rails, by means of bolts for example or any type of suitable fixing means.

The method then comprises a step of placement of an adhesive layer 14 onto the structure of the floor panel 10. This adhesive layer comprises a plurality of through-holes 15. It also comprises an adhesive top face 14a and an adhesive bottom face 14b. The adhesive layer 14 is placed on top of the floor panel 16, said adhesive bottom face 14b of the layer 14 being pressed on and secured to the top face 16a of the floor panel 16.

The method for avoiding the appearance of blisters on an aircraft floor structure 10 comprises a final step of placement of an air-impermeable rigid carpet 12. This carpet 12 comprises a top face 12a and a bottom face 12b. According to an embodiment of the disclosure, said bottom face 12b of the carpet 12 includes grooves 13 and comprises, over its periphery, at least one air evacuation channel 17. The air-impermeable rigid carpet 12 is placed on top of the adhesive layer 14, said bottom face 12b of the carpet 12 being pressed on and secured to the top face 14a of the adhesive layer 14.

The rigid and air-impermeable carpet 12 and the adhesive layer 14 may be the only modified elements of the structure. This structure is therefore simpler to manufacture and to install.

Thus, during the installation of the structure of the floor, air at ambient pressure is held captive between the adhesive layer 14 and the floor panel 16. Then, when the air-impermeable rigid carpet 12 is pressed on and secured to the adhesive layer 14, air at ambient pressure is, likewise, held captive between these latter two elements. During the flight of the aircraft, the pressure of the cabin decreases relative to the pressure on the ground, the air held captive remaining at the same pressure. Because of the pressure difference between the air of the cabin and the air held captive, the latter expands. The air held captive between the adhesive layer 14 and the floor panel 16 passes through the multiple holes 15 of the adhesive layer 14, as indicated by the arrows in FIG. 3. This air is then channeled and drained by the grooves 13 to the evacuation channel 17. To finish, the air is evacuated by virtue of the evacuation pipes 18. Thus, the pressure is balanced between the cabin of the aircraft and the structure of the floor 10 which avoids the appearance of blisters or of crinkling of the floor of the cabin of the aircraft.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. An aircraft cabin floor structure comprising:
   a rigid carpet impermeable to air, the carpet having a carpet top face and a carpet bottom face;
   an adhesive layer having an adhesive top face and an adhesive bottom face, the adhesive top face adhering to the carpet bottom face; and
   a floor panel impermeable to air, the floor panel having a panel top face and a panel bottom face, the adhesive bottom face adhering to the panel top face,
   wherein:
      the carpet bottom face includes grooves and comprises on its periphery at least one air evacuation channel; and
      the adhesive layer comprises a plurality of through holes.

2. The aircraft cabin floor structure according to claim 1, wherein the at least one evacuation channel is linked to at least one evacuation pipe.

3. The aircraft cabin floor structure according to claim 1, wherein the grooves are incorporated directly in the carpet during the manufacturing thereof.

4. The aircraft cabin floor structure according to claim 1, wherein the grooves are added after the carpet has been manufactured and the grooves are integral to the carpet.

5. The aircraft cabin floor structure according to claim 1, wherein the grooves are toothed.

6. The aircraft cabin floor structure according to claim 1, wherein the evacuation channel is arranged over an entirety of the periphery of the carpet.

7. The aircraft cabin floor structure according to claim 1, wherein the grooves are distributed over an entirety of a width of the carpet, a length of each groove being equal to a corresponding length of the carpet.

8. The aircraft cabin floor structure according to claim 1, wherein a height of each groove is between 20% and 30% of a height of the carpet.

9. The aircraft cabin floor structure according to claim 8, wherein the height of each groove is about 25% of the height of the carpet.

10. The aircraft cabin floor structure according to claim 8, wherein a width of each groove is between 20% and 30% of the height of the carpet.

11. The aircraft cabin floor structure according to claim 10, wherein the width of each groove is about 25% of the height of the carpet.

12. The aircraft cabin floor structure according to claim 1, wherein a width of the evacuation channel is between 20% and 30% of the height of the carpet.

13. The aircraft cabin floor structure according to claim 12, wherein the width of the evacuation channel is about 25% of the height of the carpet.

14. The aircraft cabin floor structure according to claim 1, wherein a width of the evacuation channel is equal to a width of the grooves.

* * * * *